United States Patent [19]
Scibilia et al.

[11] Patent Number: 6,021,341
[45] Date of Patent: Feb. 1, 2000

[54] SURGICAL PROBE FOR LAPAROSCOPY OR INTRACAVITARY TUMOR LOCALIZATION

[75] Inventors: Guerrino Scibilia, Carsoli; Alessandro Soluri, Rome, both of Italy

[73] Assignees: Consiglio Nazionale Delle Ricerche, Rome; Pol. Hi. Tech. s.r.l., Carsoli, both of Italy

[21] Appl. No.: 08/983,148

[22] PCT Filed: Jul. 12, 1996

[86] PCT No.: PCT/IT96/00142

§ 371 Date: Mar. 5, 1998

§ 102(e) Date: Mar. 5, 1998

[87] PCT Pub. No.: WO97/03369

PCT Pub. Date: Jan. 30, 1997

[30] Foreign Application Priority Data

Jul. 13, 1995 [IT] Italy .................................. RM95A0481

[51] Int. Cl.[7] .................................................... A61B 5/05
[52] U.S. Cl. ......................................... 600/407; 600/436
[58] Field of Search .................................. 600/406, 407, 600/436, 431

[56] References Cited

U.S. PATENT DOCUMENTS

| | | | |
|---|---|---|---|
| 5,014,708 | 5/1991 | Hayashi et al. | 600/406 |
| 5,088,492 | 2/1992 | Takayama et al. | 600/431 |
| 5,325,855 | 7/1994 | Daghighian et al. | 600/407 |
| 5,383,456 | 1/1995 | Arnold et al. | 600/407 |
| 5,429,133 | 7/1995 | Thurston et al. | 600/407 |
| 5,857,463 | 1/1999 | Thurston et al. | 600/436 |

FOREIGN PATENT DOCUMENTS

WO94/03108  2/1994  WIPO.

*Primary Examiner*—Jeffrey R. Jastrzab
*Assistant Examiner*—Ali M. Imam
*Attorney, Agent, or Firm*—Smith, Gambrell & Russell, LLP

[57] ABSTRACT

The surgical probe according to the invention includes a collimator, made of lead or a high Z, atomic number metal; a scintillating crystal sensitive to gamma ray having an energy in the range from 30 KeV and 1 MeV; a light guide system; a photomultiplier; and electronics capable of integrating and converting analog signals to digital signals. The probe can be used in either intracavitary mode, or in laparoscopic mode, by putting the probe in a specific trocar. The apparatus may automatically subtract the background; and may provide visualization on a monitor. The probe can also include a flexible tip, in order to enlarge the field of view which the probe can be used to examine.

22 Claims, 5 Drawing Sheets

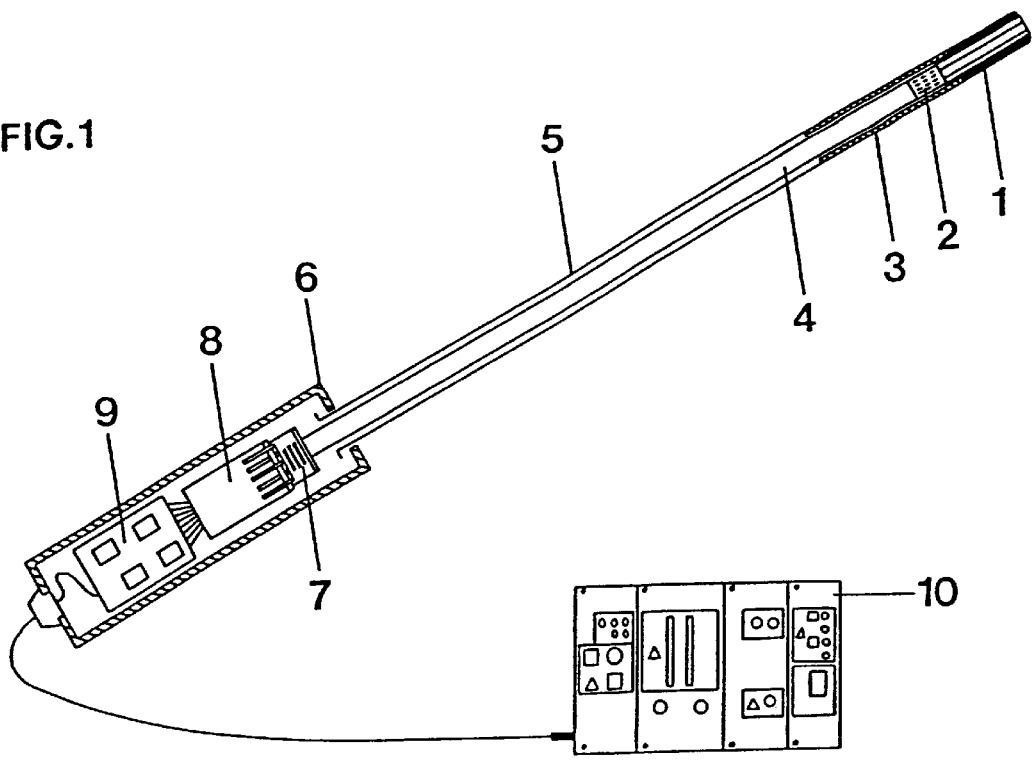
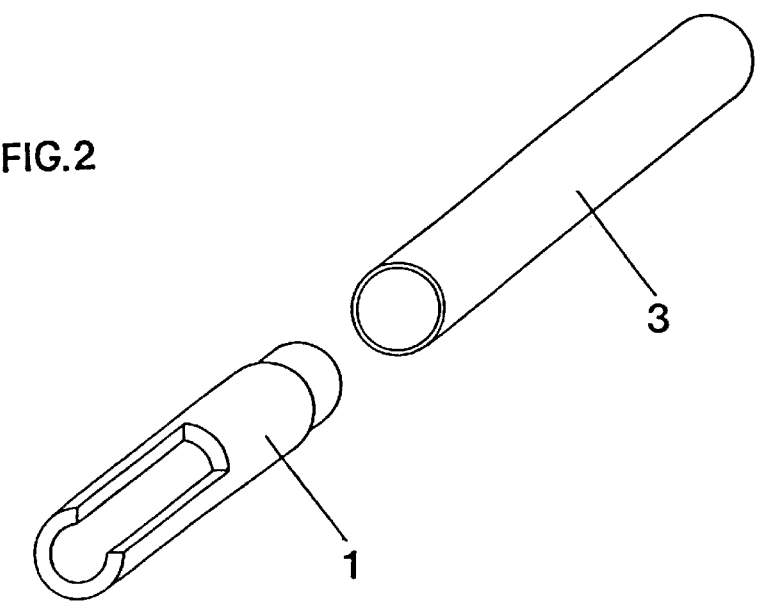

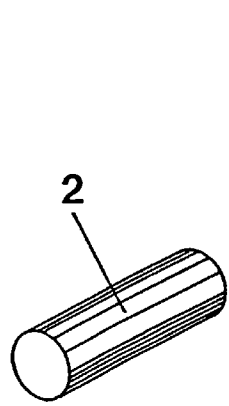
FIG.3
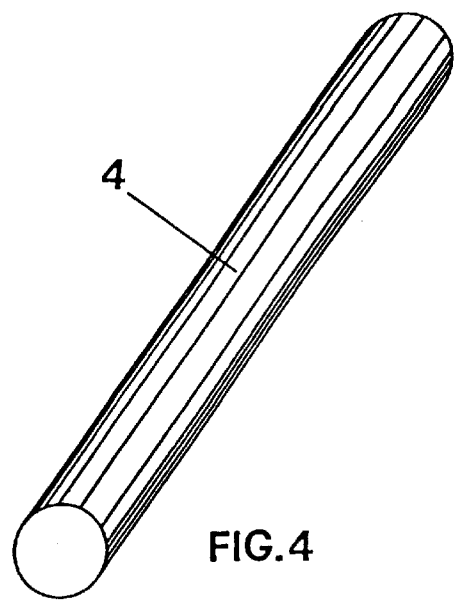
FIG.4
FIG.5 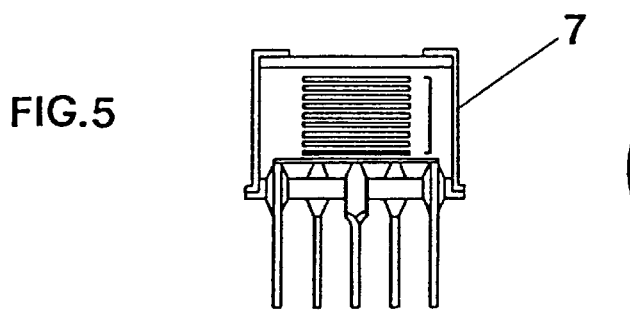 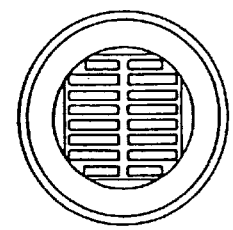
FIG.6
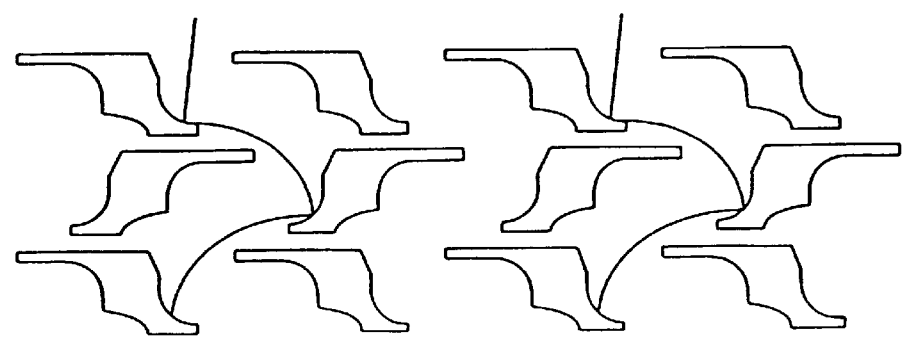

SURGICAL PROBE FOR LAPAROSCOPY OR INTRACAVITARY TUMOR LOCALIZATION

BACKGROUND OF THE INVENTION

1. Field of the Invention

The present invention relates to with a surgical probe for laparoscopy and intracavitary tumour localization. A surgeon needs to localize a tumour in order to remove it and thus he usually makes use of the traditional diagnostic means to search for the tumour, such as: CAT, NMR, Scintigraphy. However during the operation, the surgeon can still need to better define the area to be cut and removed. Thus he can use a so-called "SURGICAL-PROBE": after injecting the patient with a radioisotope-doped drug capable of being absorbed by the tumour cells, the surgeon can detect the gamma radiations emitted by the radioisotope via a probe practically acting as a Geiger-Muller detector.

The probe sensitivity to gamma radiations is such that it gives analogic signals, whose number is proportional to the detected radioisotope concentration. The detected signals are then reversed into digital signals thus giving a luminous and/or noisy scale proportional to the detected radioisotope concentration.

By tracing the most active area, the tumour site can be localised.

2. Description of the Related Art

As an example the "MARTIN PROBE", presently on the market, is a cylindrical proportional tube, 30 mm in diameter, containing an ionisable gas and two electrodes to which a high voltage is applied: the gamma rays are detected by gas ionising and electrical signal generating means.

The availability of a small dimension probe with a good efficiency for low energy rays would be desirable.

The Martin Probe, however, has an excessive hindrance and a weak low energy-rays efficiency thus resulting in:

1) a very rough spatial resolution, such as 4 cm, which gives a bad tumour localisation 2) a bad tumour-to-background ratio resolution which makes the probe of scarce utility.

It is then clear that the poor obtainable advantages are limiting the use of the surgical probe.

Several probes are known on the market, all of them used in in intracavitary mode only, which is made of about 20 mm diameter cylindrical tube having inside a scintillating crystal positioned on the tip of the tube, coupled with a photomultiplier.

When the gamma radiations emitted by the radio pharmaceutical, previously injected into the patient, hit the scintillating crystal, a specific light is emitted and collected by the photomultiplier which, in turn, converts the optical into an electrical signal, which can then be used to vary a visible or voiced scale whose value is proportional to the radiation intensity. Furthermore, being the probe active area of a few square centimeters with the possibility of collimation, the spacial resolution results to be limited to a few centimeters.

The use of the described probe is only limited to the intracavitary mode or, in other words, when necessarily the surgeon opens the patient.

It is desirable however to use a probe via laparoscopy to detect with high precision the sites where radioactive tracers cumulate and indicate the presence of a tumour to be surgically removed, thus guiding the surgeon toward the exact tumour position with the possibility to discriminate tumoural from healthy tissue with a few millimeter precision.

Before the surgical operation it would be necessary to precisely locate the point of radioactive tracer maximum concentration together with the surrounding area affected by the surgical removable tumour.

U.S. Pat. No. 5,429,133 discloses a laparoscopic instrument having a hand-grippable base to which an elongate accessing tube is connected which extends to a tip. Extending inwardly from the tip is a detection support region within which a radiation transmissive window is formed. Immediately spaced from and behind the window a detecting crystal such as cadmium telluride is retained to detect the radiations emitted from a $^{125}I$ source and retained in a mount structure designed to minimize noise generation due to microphonic (piezoelectric) phenomena.

PCT Application WO 94/03108, on which the preamble of present claim 1 is based discloses a laparoscopic surgical probe for localizing tumours and creating images of tumour affected radiation emitting organs comprising a first section based upon scintillator means for receiving radiation rays emitted from said radiation emitting organs and converting the radiation rays into light signals, light transmission means to transmit the light signals generated by said first section to a second section including a position sensitive light signal detector and electronic means for receiving said light signals and producing images of said radiation emitting organs.

U.S. Pat. Nos. 5,014,708 and 5,088,492 disclose multifunction devices wherein use is made of collimators in surgical probes.

BRIEF SUMMARY OF THE INVENTION

The present invention solves the above described problems. To this purpose the invention deals with a gamma-ray sensitive surgical probe which can be used both in laparoscopic or intracavitary mode to detect tissue areas affected by small size tumours.

BRIEF DESCRIPTION OF THE DRAWINGS

Detailed features and advantages of the invention will further result from the following description with reference to the attached drawings, given as a non-limiting example and where:

FIG. 1 is an expanded view of the invention device where the composing parts are indicated;

FIG. 2 shows the collimator and the shield details;

FIG. 3 shows the scintillating crystal;

FIG. 4 shows the light guide scheme;

FIG. 5 shows the photomultiplier and a top view;

FIG. 6 shows the electron multiplication mechanism taking place inside the photomultiplier (metal channel dynodes);

Figure 7:
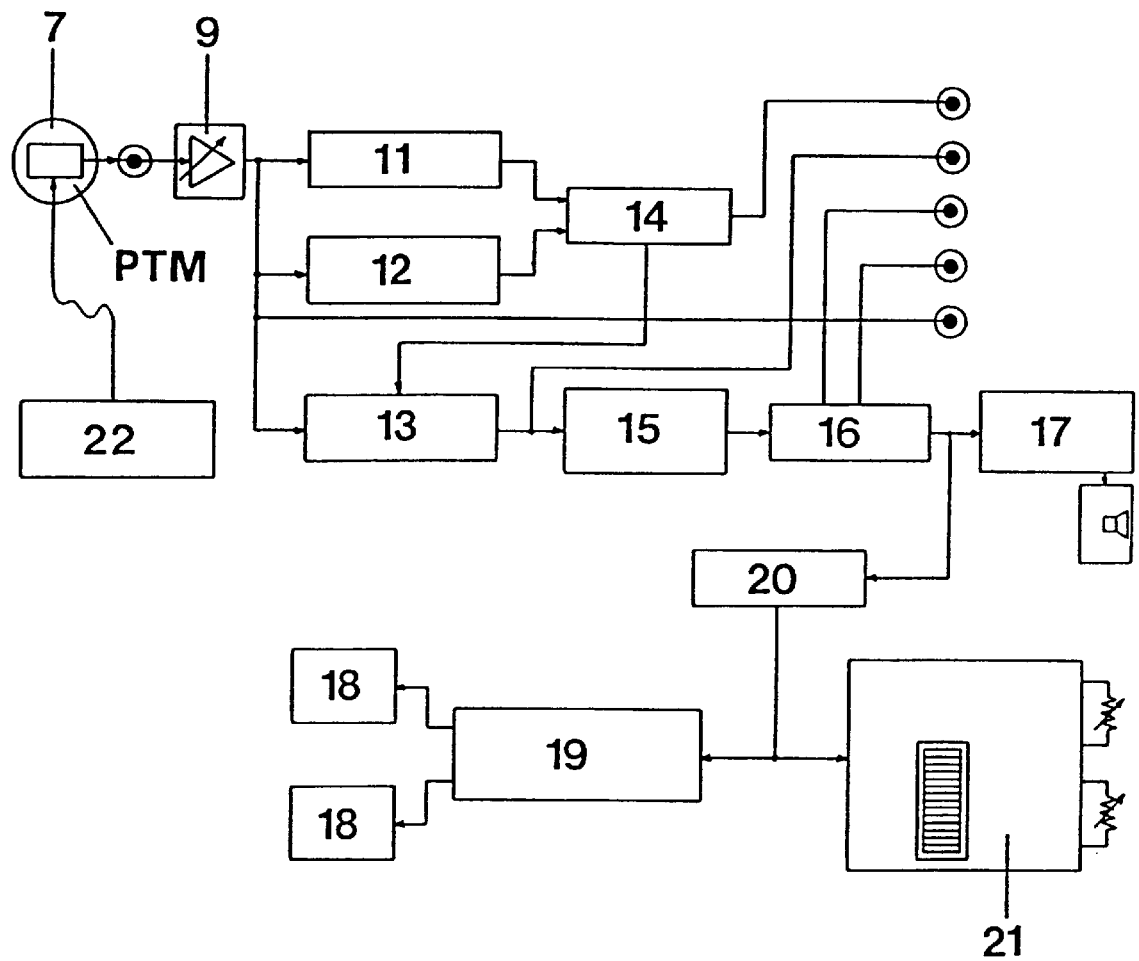
FIG. 7 shows the hardware electronics block lay-out.
Figure 8A:
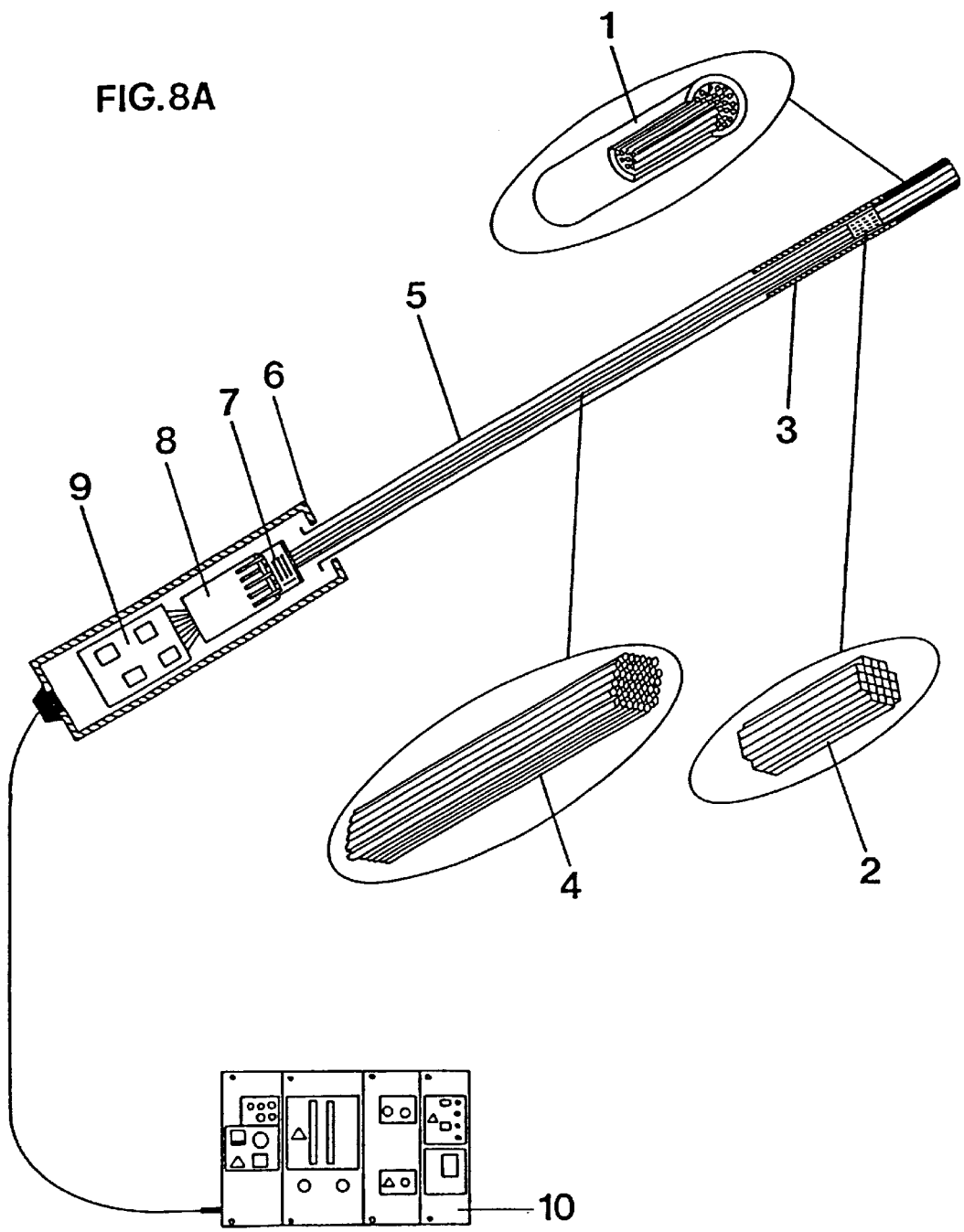
FIGS. 8a and 8b show the hardware electronic block lay-out variation relating to an imaging probe.
Figure 8B:
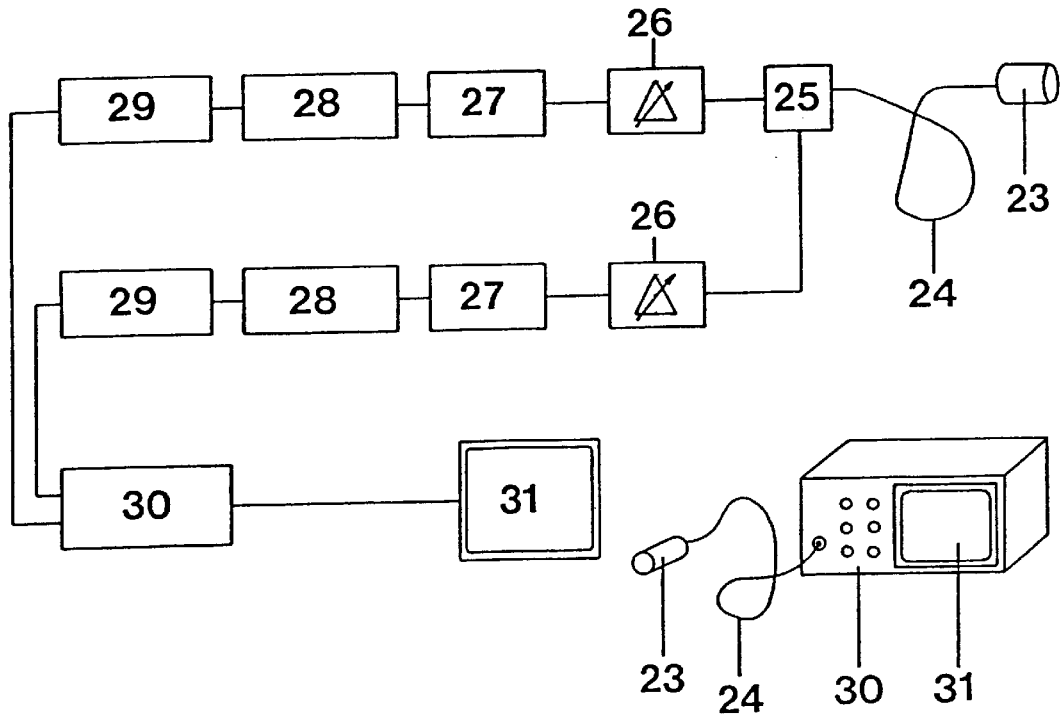

With reference to the figs. the new probe and its components are described:

—the collimator 1 made of lead or a high Z metal (such as W, Au, etc), which allows only the gamma-rays in a certain solid angle to pass through the holes; the collimator has a 10 mm diameter;

—a scintillating crystal 2 made of YAP:Ce (Ittrium alluminate Cerium doped with perovskite structure) sensitive to gamma rays with energy ranging from 30 KeV to 1 MeV, emitting light with 380 nm peak wavelength; the crystal has a 6 mm diameter;

—a tungsten shield 3 to protect the scintillating crystal from gamma rays coming from side direction;

—a light-guide system 4, optically coupled to the scintillating crystal on one side and to the photomultiplier on the other side, having 8 mm diameter and about 200 mm long;

—a jacket 5 made of inert and sterilizable material for the part to be introduced into the patient, having 11 mm diameter and about 250 mm long;

—a container 6 for incapsulating the photomultiplier;

—a photomultiplier 7 collecting the optical signal guided by the light guide and modifying it into an electrical signal. The photomultiplier used is a compact type made of 8 thin metallic channels dynodes incapsulated into a 15 mm diameter and 10 mm thick cylinder as shown in FIG. 5, and position sensitive via a charge collecting multi-anode system shown in FIG. 6;

—an electronic hardware 10 to integrate and convert the analog signals into digital signals, giving in real time a measure proportional to the detected signals.

The hardware shown in FIG. 7 includes:

—a preamplifier 9 and resistive voltage divider of the photomultiplier 8, integrated and assembled inside the probe; the probe detected signal enters into a varying gain amplifier 9 connected to three parallel functional blocks;

—an impulse detector 11 giving a signal proportional to the probe detected gamma radiation;

—an impulse synchroniser 12 generating a synchronism signal when an impulse maximum value is reached;

—a sampler 13 (sample and hold), governed by a first monostable device 14 which exactly synchronise the sampler with the maximum impulse.

The sampler is linked to a window selecting circuit 15, which allows to select two or more energy windows, called A, B, etc, adapting and optimising the probe answer to the several radioisotopes used.

The said window selecting system is linked to a second monostable device 16, generating impulses reaching both a sound emitter device 17 and a couple of luminous led bar visualising blocks 18, crossing through a filters and amplifiers chain 20.

The luminous visualising blocks allow to see both the impulse frequency 21 and the actual probe position frequency in respect to the frequency maximum 19.

Figure 9:
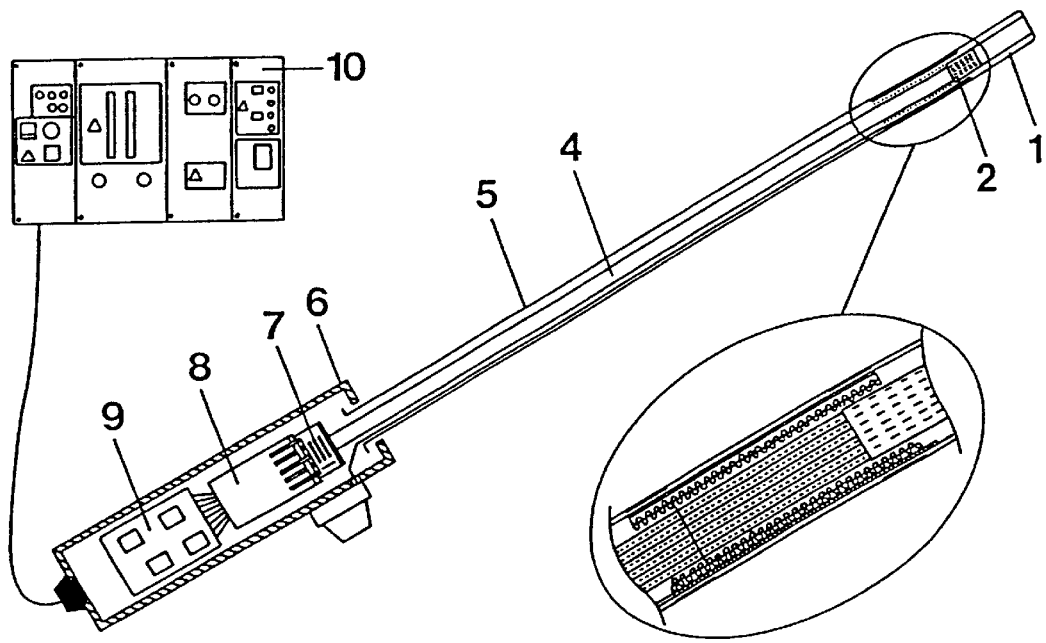
FIG. 9 shows a flexible probe variation.

FIG. 9 shows a variation of the invention where it is possible to slightly bend the probe's tip via an externally guided knob system so that also hardly accessible sites can be screened and detected and a larger volume can be explored.

The jacket 5, as already said, is entirely made of inert and sterilisable material, while the part of the probe remaining outside the patient body, is made of a 30 mm diameter and about 100 mm long cylinder.

Via the introduction of the probe through a "trocar" (laparoscopic probe), or via the intracavitary mode, into the body of a patient which has been previously injected with a radioisotope doped drug preferentially cumulating onto the tumour cells and emitting 30 KeV to 1 MeV gamma rays, the surgeon can trace the tumour by finding the maximum gamma emitting site with a precision up to about 5 mm.

This gives the surgeon the possibility to operate with high precision only in the tumour affected area, thus reducing the surgery induced damages and the patient risk.

Furthermore the high sensitivity of the probe allows the use of energy graded isotopes and gives the possibility to dope specific anti-body with various radioisotopes for specific tumours.

In possible variations of the invention, the laparoscopic surgical probe can use a matrix of scintillating crystals having a section of about 1×1 mm and within the range 0.5×0.5 mm to 2×2 mm, where the crystals are optically separated one from the other, and the crystal to crystal separating set is about 0.1 mm thick and within 3 microns to 0.5 mm.

Furthermore scintillating crystals such as CsI(Tl), NaI, (Tl), BGO, LSO etc., can be used, and the light guide can be made with plastic material having refractive index within 1.41 to 1.62 such as PMMA, PS, PC etc., optically coupled both with the scintillating crystal and to the photomultiplier.

In a possible variation the light-guide system is made of one light-guide or optical fibre, to collect the main signal, surrounded by other light-guides or optical fibres, made of the same material but having smaller section, to collect the background signal. The light-guides or optical fibres can have a cylindrical or different section and they are each-other optically separated.

In another possible variation, the light-guides system is replaced by a bundle of optical fibres bundle, each-other optically separated, having on one side an overall section equal to the total section of the scintillating crystal and being optically coupled to the latter, without leaving any dead space; furthermore having an overall section equal to the active window of a photomultiplier on the other side. These single fibres have a round, square, exagonal or variable section with 0.3 to 2 mm diameter or side-side distance.

Moreover, said light-guides can be replaced by light-guides or optical fibres made of an inorganic material such as silica, quartz, etc..

In a variation of the invention the optical fibre guided signal is collected by a photomultiplier with 8 mm diameter active window and sensible to the single photon, or via a position sensitive photomultiplier which has a metal channel dynode system to improve the spacial resolution up to about 2 mm.

In another possible variation of the invention, the photomultiplier is replaced by a solid state detector such as a silicium, gallium arsenide, or avalanche photodiode having pixel of about 0.5×0.5 mm or within 0.2×0.2 mm to 2×2 mm, capable to read light photons, and determining the position and the energy absorbed by the scintillating crystal during the gamma-ray interaction.

Via the electronic circuit shown in FIG. 7, the photomultiplier analogic signals can be converted into visible or sound digital signals proportional to the detected gamma-rays intensity thus localising the maximum concentration of radio-tracer (tumour).

The invention takes also in consideration the integration of all the signals and their convertion via soft-ware into real-time imaging, to give the gamma-rays distribution with a spacial resolution of about 2 mm.

In another variation of the invention, the laparoscopic surgical probe can be introduced through a 12 mm diameter trocar into the body of a patient, the probe being made of an inert and sterilizable material such as teflon, stainless steel or similar, and the portion introduced through the trocar can be flexible so that the tip can be bent via an external guide knob system and which allows to scan a bigger portion of area.

Whereas the overall length of the probe of the invention is about 35 cm., the portion introduced through the trocar is about 25 cm long or within 10 cm to 30 cm, and has about 11 mm diameter or within 10 mm to 18 mm, and the portion remaining out of the trocar is about 100 mm long and about 30 mm in diameter.

According to the invention, the probe is connected to a system visualising both the intensity and maximum intensity position of the gamma-rays, via a colour scale and a voiced system both proportional to the gamma radiation intensity.

Furthermore in another variation of the invention an innovation in the field of the data acquisition, transfer and management system for the laparoscopic surgical probe is presented.

A microprocessor chip, with a particular software program, is the intelligent interface between the probe electronics and a personal computer. A graphic program besides handles the data presentation.

A charged particle or a gamma photon passing through the scintillating crystal represents an event memorised by the acquisition system together with the measured energy, the time and, eventually the probe position.

The microprocessor transfers at the same time the event data to the computer.

A graphic program handles the event data visualization on the personal computer monitor.

Tumour sites localization is based on the tumour to background counting ratio and so the graphic program allows the visualization of the counts number as a function of time.

Once chosen a time window period, in the range between 10s and 90s, the probe use protocol suggests that the surgeon shall move the probe at a constant speed in such a way as to carry out a scanning of the area of interest: each zone, placed in front of the probe tip, has a radioactive emission which is correlated to the measured counts number and the counting rate visualization represents an imaging of the investigated area radioactivity.

In case a maximum of activity has been found in the first scanning, then the maximum emission point can be found out again by moving the probe back to the scanned way as long as the actual counting rate equals the previous peak value which remains on the PC screen for a maximum period of 90s.

The tumour sites localization is also based on the energy selection.

The graphics program carries out the visualization of the incident gamma-ray energy spectrum, thus allowing, on one hand the detector calibration according to the used radioactive tracer, and, on the other hand, the energy selection window: the acquisition program selects events which, coming from the zone in front of the probe tip without being scattered and without loosing energy, have an energy which is characteristics of the photoelectric peak, events scattered by Compton effects, are rejected, on the basis of an energy lower than the photoelectric peak value, because they are not coming directly from the zone investigated by the probe.

The imaging capability is based on the possibility of coupling a measured counting rate and the investigated area space position of the probe.

Keeping this in mind another aspect of the invention is that a position recognition device and an engine, moving the probe along a X-Y plane, is coupled to the probe—electronics—personal computer system.

An automatic scanning program carries out the counting rate measurement for different probe positions along a plane, in order to obtain the image of the examined zone radioactive emission.

Finally the radiation intensity visualising system can be replaced by a real time imaging system which allows to see the whole probe explored area by showing a light-colour intensity proportional to the gamma-rays intensity, with a spatial resolution up to about 2 mm.

Obviously, the construction details and the embodiments can widely vary in respect to what described and shown as a simple example, without departing from the scope of the present invention.

We claim:

1. A laparoscopic surgical probe for localizing tumors and creating images of tumor-affected radiation emitting organs, said laparoscopic surgical probe comprising:

first components, including
  a collimator member and
  a scintillator means for receiving radiation rays emitted from the radiation emitting organs and converting the radiation rays into light signals;
a light transmission means to transmit the light signals generated by said first components to second components, including
  a position sensitive light signal detector and
  an electronic means for receiving said light signals and producing images of said radiation emitting organs, wherein
  (a) said first components, said light transmission means and said second components form a unitary body probe;
  (b) a converting means is provided, which are adapted to receive and convert radiation emitted from the radiation emitting organs in the energy range of 30 KeV to 1 MeV; and
  (c) said collimator member has a section in the range between 6 mm and 15 mm, with a hole having 3 mm to 10 mm diameter, with a wall thickness in the range between 0.1 mm and 4 mm and with a length in the range between 5 mm and 50 mm.

2. A laparoscopic surgical probe according to claim 1, wherein said first components further comprise a collimator member comprised of lead or another high Z metal which allows gamma ray passage through its hole only, and within a precise solid angle; the collimator having an external diameter between 10 mm and 15 mm;
a scintillating crystal, sensitive to gamma rays having energy between 6 KeV and 1.3 MeV, emitting a blue or green light; the crystal having an external diameter in the range between 6 mm and 10 mm;
a tungsten shield, to shield the scintillating crystal from gamma rays coming from lateral directions; and wherein
said transmission means include:
  a light guide system, optically coupled to the scintillating crystal on one side and to the photomultiplier on the other side, having a 8 mm cross section and being 200 mm in length;
  a jacket made of an inert and sterilizable material, which has a cylindrical shape with a diameter in the range of 10 mm to 15 mm and 250 mm in length; and
wherein said second components include:
  a container to house the photomultiplier;
  a photomultiplier which turns the scintillation light pulse into an amplified electrical signal and which is a very compact one in which dynodes are stored in a cylindrical having a diameter in the range of 10 mm to 15 mm and a length in the range of 10 mm to 45 mm;

an electronic circuit which converts the analog signals to digital ones, giving in real time a measurement of the integrated charge, which is proportional to the energy of the incident particle, and a measurement of the number of the gamma rays, interacting according to photoelectric effect in the scintillating crystal, as a function of time or probe position.

3. A laparoscopic surgical probe according to claim 2, wherein said scintillator means comprise a matrix of scintillating crystals, each crystal having a cross section in the range between (0.5×0.5) square mm and (2×2) square mm and being optically separated from the other ones, and the separation between the crystals having a thickness in the range from 3 microns to 0.5 mm.

4. A laparoscopic surgical probe according to claim 3, wherein said scintillating crystal is selected from the group consisting of CsI (Tl), NaI (Tl), BGO, and LSO crystals.

5. A laparoscopic surgical probe according to claim 4, wherein said light guide is made of a material having a refractive index between 1.41 and 1.62.

6. A laparoscopic surgical probe according to claim 1, wherein the scintillating crystal is directly optically coupled to the photomultiplier.

7. A laparoscopic surgical probe according to claim 1, wherein the scintillating sensitive detector and the light guide are comprised of a central part to collect the signal coming from the main source and of a peripherical part to collect the signal coming from the background, the central part being made of a crystal coupled to a light guide or an optical fiber of similar cross section, while the surrounding part is comprised of a few crystals coupled to light guides or optical fibers having a smaller cross section than the central part ones, and where both the individual scintillating crystals and the light guides or optical fibers are optically separated from each other.

8. A laparoscopic surgical probe according to claim 1, wherein the light guide is comprised of an optical fiber bundle, having a cross section which, on one side, is equal to the total surface of the scintillating crystal, and, on the other side, is similar to the active area of the photomultiplier without formation of dead zones, and said fibers have a square or circular or hexagonal cross section and a diameter or side-side dimension ranging from 0.3 mm to 2 mm.

9. A laparoscopic surgical probe according to claim 1, wherein the plastic light guides or optical fibers are substituted by light guides or optical fibers made of an inorganic material such as silica, quartz, etc.

10. A laparoscopic surgical probe according to claim 1, wherein the optical fiber guided signal is collected by a photomultiplier with an 8 mm diameter active window and is responsive to the single photon emission.

11. A laparoscopic surgical probe according to claim 1, said position sensitive photomultiplier has a metal channel dynode system to improve the spacial resolution up to 2 mm.

12. A laparoscopic surgical probe according to claim 1, wherein the photomultiplier is replaced by a solid state detector, with pixels of from 0.2×0.2 mm to 1×1 mm, which reads light photons, and which indicates the position and the energy absorbed by the scintillating crystal during interaction with the gamma ray.

13. A laparoscopic surgical probe according to claim 12, wherein an electronic circuit converts the photomultiplier analog signals into visible or voiced digital signals.

14. A laparoscopic surgical probe according to claim 13, wherein the visible and voiced digital signals are proportional to the detected gamma ray intensity, thus indicating the position of the highest radiotracer concentration.

15. A laparoscopic surgical probe according to claim 14, wherein the signals are integrated and, via software, transformed into a real time imaging, to give images showing gamma ray emission distributions with a spatial resolution up to 2 mm.

16. A laparoscopic surgical probe according to claim 1, wherein the probe is jacketed with inert and sterilizable material and is introduced into a trocar having a 12 mm minimum internal diameter.

17. A laparoscopic surgical probe according to claim 16, wherein the probe introduced into the trocar is flexible so that the tip portion can be bent via an externally guided knob system to scan a larger area.

18. A laparoscopic surgical probe according to claim 17, wherein the overall length is 35 cm and the portion introduced into the trocar is from 10 cm to 30 cm long, and from 6 mm to 22 mm in diameter, and the external portion is 100 mm long and 30 mm in diameter.

19. A laparoscopic surgical probe according to claim 1, wherein, via dedicated software, a graphic program handles the event data visualization on a personal computer monitor and the tumor site localization is based on the tumor to background counting ratio, thus allowing the graphical visualization of the count numbers as a function of time.

20. A laparoscopic surgical probe according to claim 19, wherein the dedicated software graphic program carries out the visualization of the incident gamma-ray energy spectrum, thus allowing, on one end, the detector calibration according to the used radioactive tracer, and, on the other end, the energy selection window, and where acquisition program selects events which enter directly the detector without scattering, thus having an energy characteristic of the photoelectric peak, while rejecting events scattered by Compton effects and having an energy lower than the photoelectric peak.

21. A laparoscopic surgical probe according to claim 20, wherein the gamma ray intensity and the maximum intensity position are visualized via a luminous color scale and a voiced system both of which are proportional to the gamma ray intensity.

22. A laparoscopic surgical probe to according to claim 21, wherein the intensity visualization system is replaced by a real time imaging to see all the investigated area by showing the light-color intensity proportionally to the gamma ray intensity with a spacial resolution up to 2 mm.

* * * * *